US012623604B2

(12) United States Patent (10) Patent No.: US 12,623,604 B2
Pantea et al. (45) Date of Patent: May 12, 2026

(54) **SIDESTEP PLATFORM SERVO /
ELECTRICAL REMOVAL MECHANISM**

(71) Applicant: Magna Exteriors Inc., Aurora (CA)

(72) Inventors: Sorin O. Pantea, Woodbridge (CA);
Carlo Porretta, Woodbridge (CA);
Jeffrey R. Johnson, White Lake, MI
(US)

(73) Assignee: Magna Exteriors Inc., Aurora (CA)

( * ) Notice: Subject to any disclaimer, the term of this
patent is extended or adjusted under 35
U.S.C. 154(b) by 399 days.

(21) Appl. No.: 18/343,998

(22) Filed: Jun. 29, 2023

(65) Prior Publication Data

US 2024/0001854 A1    Jan. 4, 2024

Related U.S. Application Data

(60) Provisional application No. 63/356,747, filed on Jun.
29, 2022.

(51) Int. Cl.
*B60R 3/00* (2006.01)

(52) U.S. Cl.
CPC .............. *B60R 3/007* (2013.01); *B60R 3/002*
(2013.01)

(58) Field of Classification Search
CPC ................................ B60R 3/002; B60R 3/007
See application file for complete search history.

(56) References Cited

U.S. PATENT DOCUMENTS 9,452,713 B2 * 9/2016 Stickles .................... B60R 3/02
2009/0044729 A1 * 2/2009 Navarre .................... B60P 1/43
280/727

* cited by examiner

*Primary Examiner* — Bryan A Evans

(57) ABSTRACT

There is provided a sidestep platform servo/electrical
removal mechanism, a running board with a step that is
operably removable without tools.

20 Claims, 4 Drawing Sheets

SIDESTEP PLATFORM SERVO / ELECTRICAL REMOVAL MECHANISM

CROSS-REFERENCE TO RELATED APPLICATIONS

This application is a Non-Provisional Patent Application and claims benefit of U.S. Provisional Patent Application No. 63/356,747, filed Jun. 29, 2022. The disclosure of the above application is incorporated herein by reference.

FIELD OF THE INVENTION

The present invention relates to a sidestep platform servo/ electrical removal mechanism.

BACKGROUND OF THE INVENTION

Installation of sidesteps on vehicles often require specialized tools during installation for the OEM manufacturers. This is undesirable in that it increases assembly cost of the vehicle and tooling required for manufacture.

Additionally, end users also cannot easily install or remove the sidesteps without specialized tools that a typical user may not possess or proficiently operate. Typical steps can also require drilling or other vehicle modifications if an end user had a desire to add sidesteps to his vehicle.

Accordingly, there is a desire for a more universally installable step adapted for a vehicle, which reduces manufacturing costs and provides easier installation and/or removal by the manufacturer and/or end user.

SUMMARY OF THE INVENTION

The present invention provides a sidestep adapted for coupling to a vehicle that incorporates easier install features.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 2:
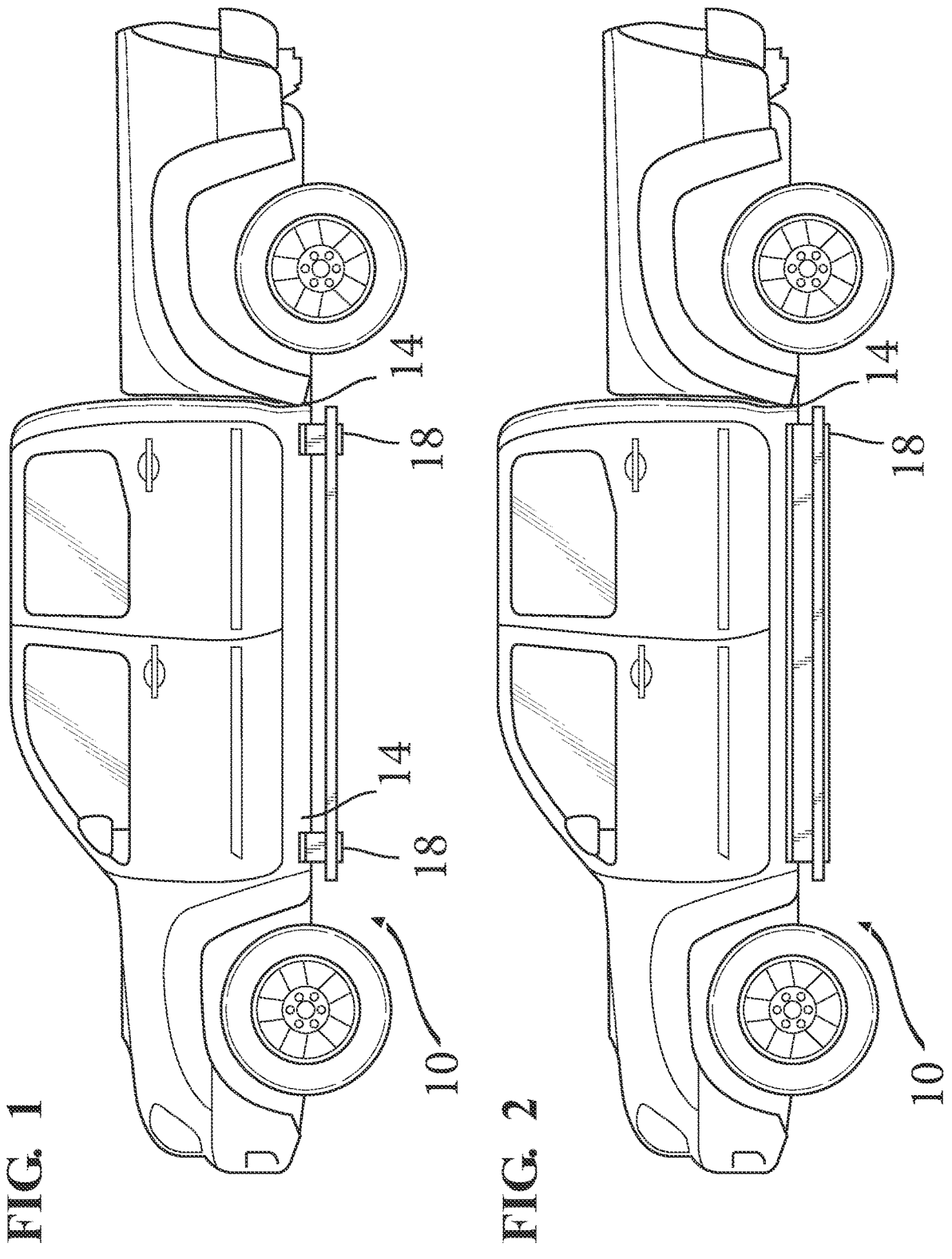
FIG. 1 is a side view of the servo mechanical sidestep attachment assembly of the present invention which has two positions of mounting on the side of a vehicle.
FIG. 2 is a side view of the servo mechanical sidestep attachment assembly of the present invention installed on a vehicle which includes a single mount spanning the length of the side step of the vehicle.
Figure 3:
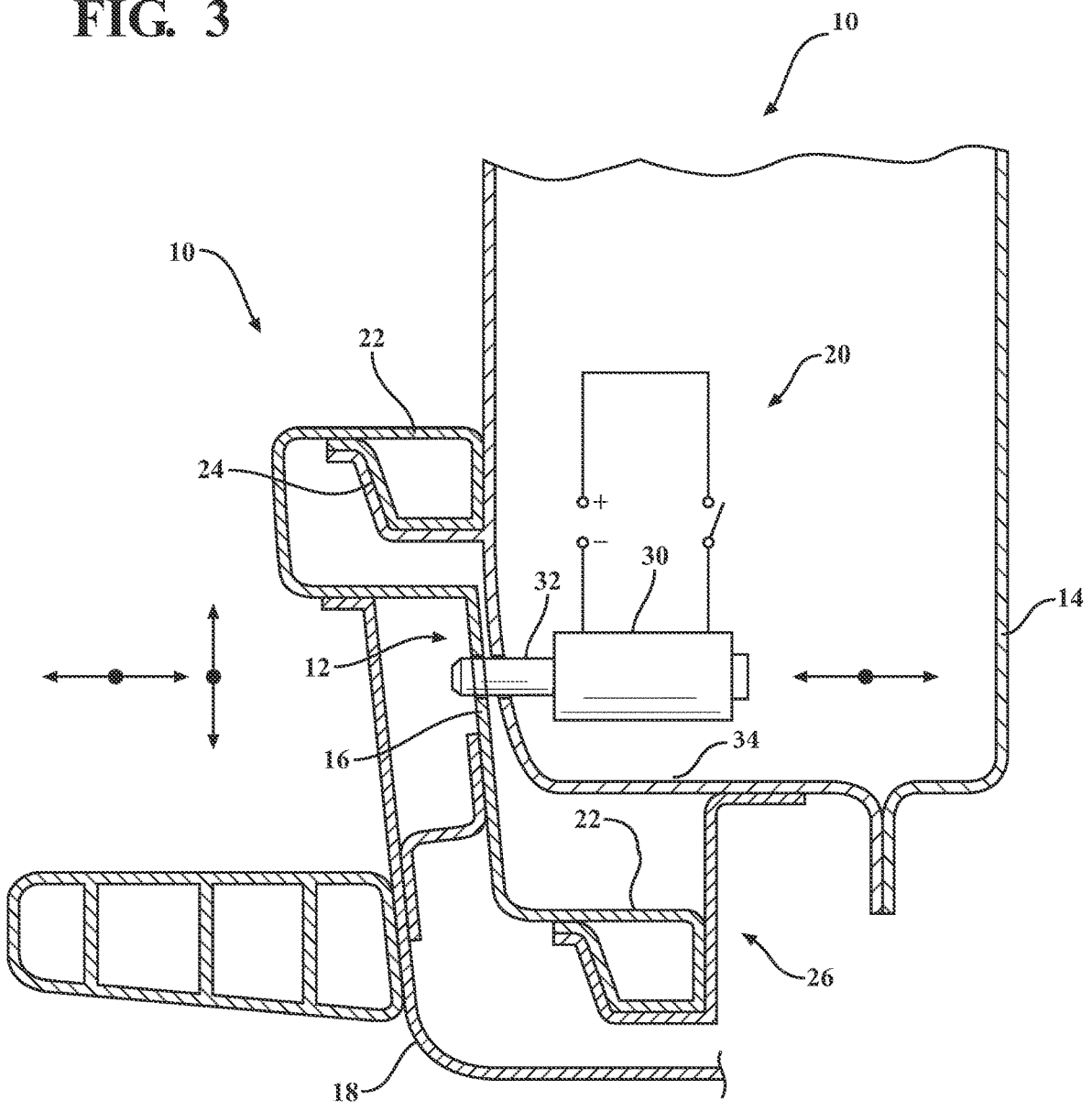
FIG. 3 is a cross-sectional view of a servo mechanical sidestep attachment assembly, in accordance with the present invention.
Figure 4:
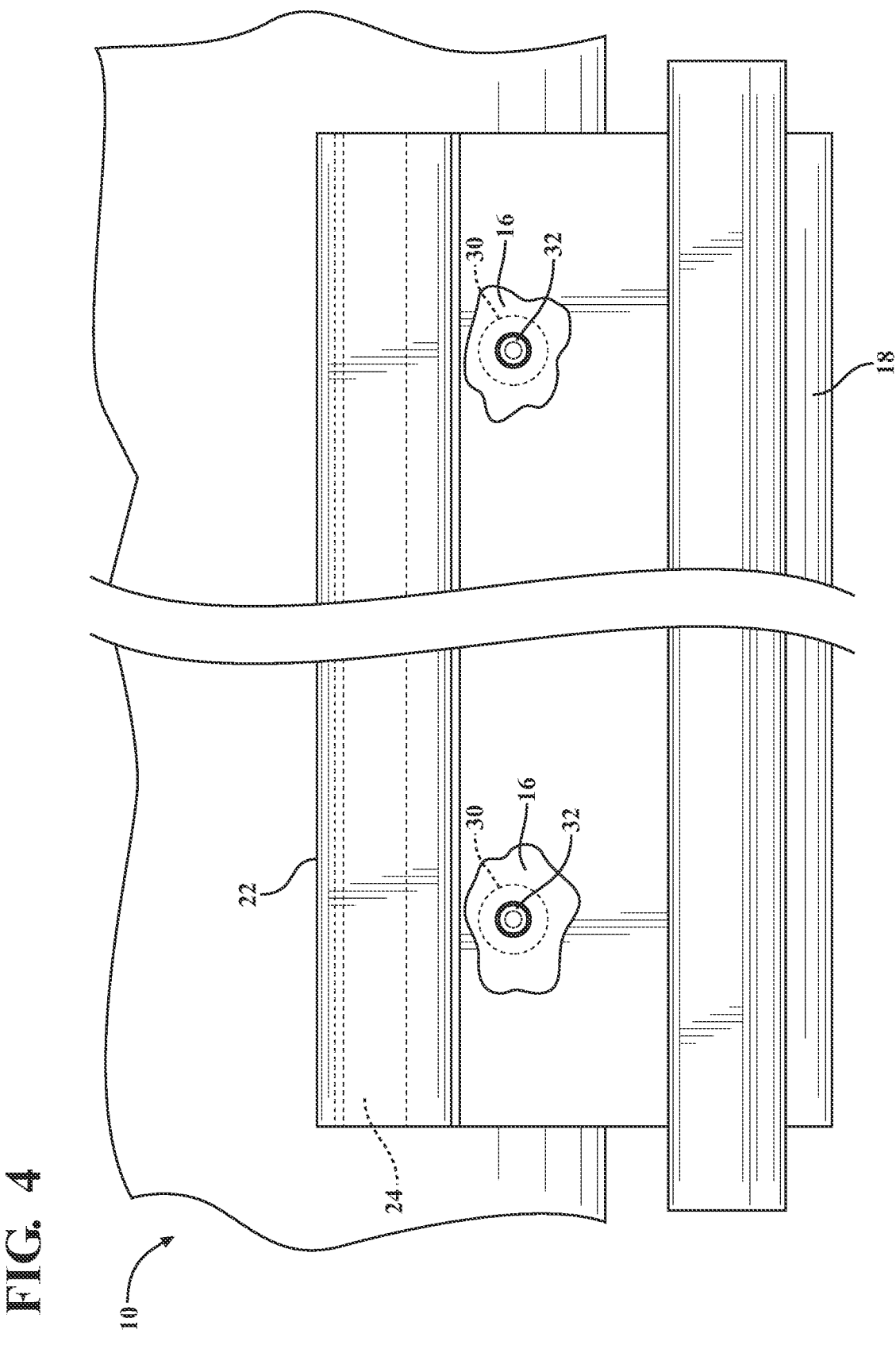
FIG. 4 is a side view partially broken away showing the actuator connection of the servo mechanical sidestep attachment assembly

The following description of the preferred embodiment(s) is merely exemplary in nature and is in no way intended to limit the invention, its application, or uses.

There is provided a servo mechanism arrangement, shown generally at 10, adapted for a sidestep that is operably adapted for connecting to a vehicle. There is provided at least one mechanical feature, indicated generally at 12, preferably incorporating at least one mechanical lock/un-lock, e.g., in a cross-car direction. In a preferred embodiment the mechanical lock is a servo that actuates a plunger via electrical current. Alternatively, a mechanical or electrical cam locking mechanism is used for locking the sidestep in place. The present invention is adapted to operably selectively connect to a predetermined vehicle structure or component 14, such as to a rocker panel, interior floor, etc., preferably with at least the at least one mechanical lock feature 12 to at least one mounting portion 16 of a bracket 18, e.g., running board bracket.

As shown in the drawings a servo driven locking mechanism 12 includes a servo 30 which actuates pin 32 for locking the step in place.

There is provided predetermined electrical features, indicated generally at 20, which provide servo/mechanical actuation, this lock can be controlled by at least one magnet, key fob integration, smart phone integration, and/or smart device integration, and any combinations thereof. The electronics incorporate at least one switch arrangement, e.g., such as in communication with a switch mechanism control.

Most preferably, the present invention incorporates the install/removal system operably selectively accessible via predetermined access through the interior floor of the vehicle.

At least one, preferably, a plurality of attachment portions 22 operably fit within corresponding predetermined features 24 of the vehicle part, and 26 e.g., channels or recesses within the inner side of the outer rocker panel 14. After the running board features are in place in the channels 24 and 26 the servo locks the running board to the vehicle. If the user wishes to remove the step the plunger is drawn inward by the servo which allows the engaging portions of the step to lift up and out. There may be a mechanical release if desired in case the user wished to remove the pin manually when there is no power such as with the ignition off.

Figure 5:
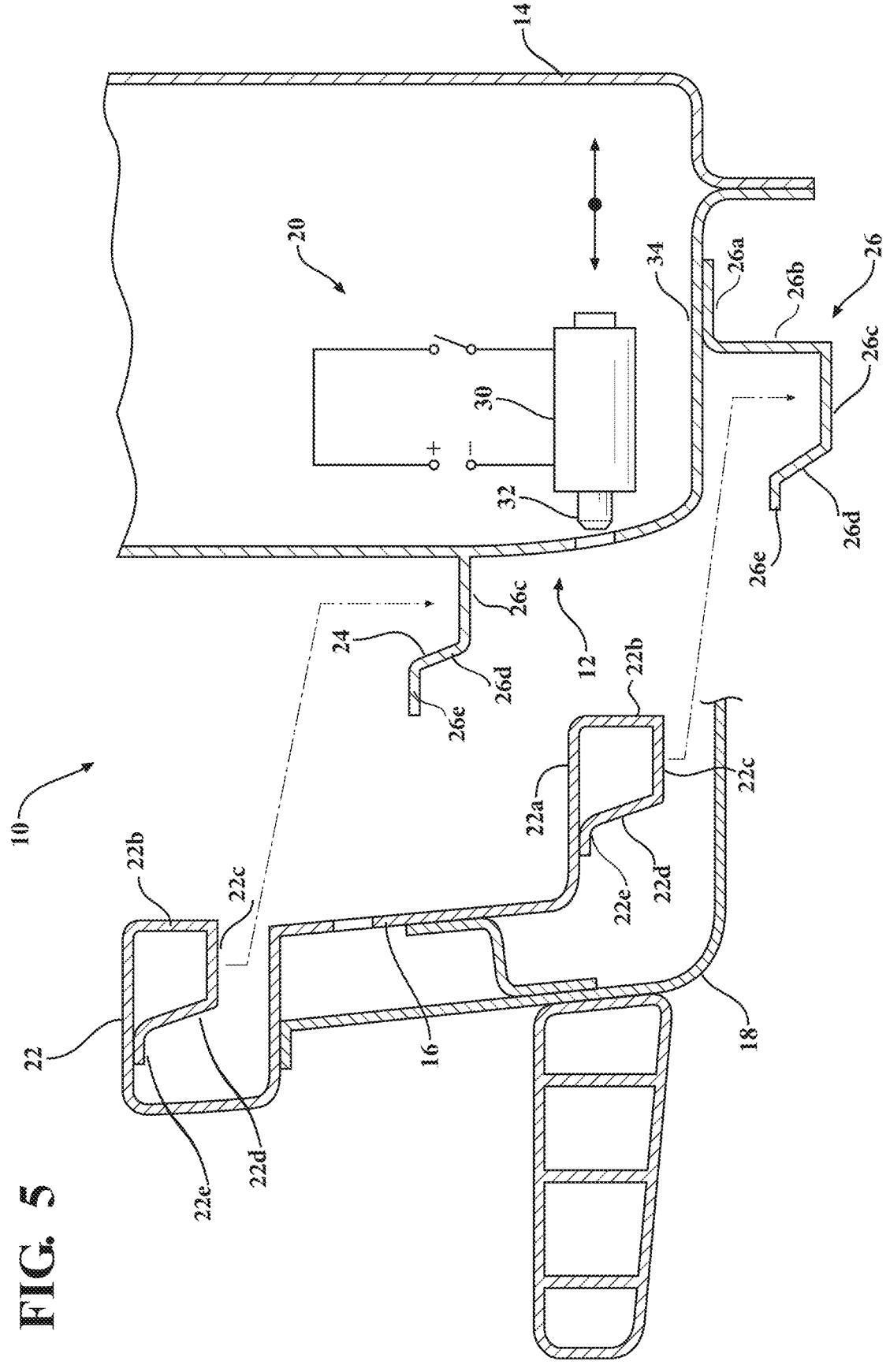
FIG. 5 is a cross-sectional view of the servo mechanical assembly showing the step separated from the vehicle.

Channel 26 is formed generally underneath the running board surface 34 of the vehicle. With reference to FIG. 5, channel 26 is formed by a first flange 26a which is attached to the running board and has a downwardly extending leg 26b which leads to an outwardly extending leg 26c. Leg 26d is at an upward angle and leads to a generally horizontal outwardly extending flange 26e. The flanges 22 and 22a have corresponding downwardly extending legs 22b outwardly extending leg 22c, upwardly angled leg 22d and an outwardly extending resting leg portion 22e which nest into the channels 24 and 26. As shown in the drawings, portion 22 which nests in to channel 24 is out board and above portion 22a which nests in the channel 26. As shown in FIG. 5, the step can be easily removed with the plunger or pin 32 retracted by lifting upwardly and outwardly and can be easily put back in place when desired by moving inwardly and downwardly for nesting into the respective channels 24 and 26 with pin 32 locking the assembly in place.

The push button preferably provides a switch control for actuation of a step surface, e.g., generally up/down, generally horizontal swing out/in, etc., and combinations thereof.

The sidestep attachment system of the present invention allows installation and removal of the sidestep of a vehicle without any tools. This is beneficial in both vehicle manufacture and end user installation and removal. While a sidestep is depicted, it is understood that the present invention is adaptable with any step and any step is contemplated without departure from the present invention, e.g., running board, fixed board, retractable board, lower-depending step, rotatable step, sidestep, assisting step, cab step, pick-up bed step, front vehicle step, rear vehicle step, door(s) step, and any combinations thereof.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A sidestep attachment system adapted for a vehicle, comprising:
   a vehicle attachment system which includes attachment parts which engage cooperating parts in the vehicle allowing positioning of the step for attachment to the vehicle;
   a locking mechanism for manually or electronically locking of the step to the vehicle when it is positioned for attachment to the vehicle; and
   wherein the sidestep attachment system is operably adapted to be selectively installed or removed without tools, and the locking mechanism includes a plunger that engages between the vehicle and the vehicle attachment system, and a servo is used for moving the plunger.

2. The sidestep system of claim 1, further comprising key fob integration.

3. The sidestep system of claim 1, further comprising operable mechanical actuation.

4. The sidestep system of claim 1, further comprising at least one running board.

5. The sidestep system of claim 1, further comprising at least one bracket adapted to operably connect to the vehicle without use of tools.

6. The sidestep system of claim 5 wherein the bracket and step are removable from the vehicle without any tools.

7. The sidestep system of claim 6 wherein the cooperating parts include two channels attached on the vehicle and the bracket includes two nesting extension members that define the attachment parts and which nest into the channels by inward and downward movement of the bracket.

8. The sidestep of claim 7 further comprising at least one running board and wherein one of said two channels is underneath the running board of the vehicle and the other one is outboard of the vehicle.

9. The sidestep of claim 8 wherein each of the two channels include a downwardly extending leg, an outwardly extending leg, and an upwardly angled leg for forming the channel.

10. A sidestep attachment system adapted for a vehicle, comprising:
   a vehicle attachment system which includes a bracket and at least one channel attached on the vehicle and a bracket which includes at least one nesting extension member which nests into the sat least one channel by inward and downward movement of the bracket allowing positioning of the step for attachment to the vehicle;

a locking mechanism for manually or electronically locking of the step to the vehicle when it is positioned for attachment to the vehicle; and
   wherein the sidestep attachment system includes two channels attached on the vehicle and the bracket includes two extension members that nest into the channels by inward and downward movement of the bracket so that the step is operably adapted to be selectively installed or removed without tools.

11. The sidestep attachment system of claim 10 wherein the channels include a first upper channel positioned outboard on the side of the vehicle and a second lower channel positioned inward and beneath the first upper channel.

12. The sidestep attachment system of claim 11 wherein the locking system is an electrically actuated plunger lock system.

13. The sidestep attachment system of claim 11 wherein the locking system is a cam operated system.

14. The sidestep attachment system of claim 11 wherein the locking system includes a manually actuatable release.

15. The sidestep attachment system of claim 13 wherein the cam operated system is electrically or manually operated.

16. A sidestep attachment system adapted for a vehicle, comprising:
   a vehicle attachment system which includes a pair of channels attached on the vehicle, and a bracket which includes at least a pair of nesting extension members which nest into the channels by inward and downward movement of the bracket allowing positioning of the step for attachment to the vehicle;
   a locking mechanism for manually or electronically locking of the step to the vehicle when it is positioned for attachment to the vehicle; and
   wherein the sidestep attachment system is operably adapted to be selectively installed or removed without tools.

17. The sidestep attachment system adapted for a vehicle of claim 16 wherein the channels include a first upper channel positioned outboard on the side of the vehicle and a second lower channel positioned inward and beneath the first upper channel.

18. A sidestep attachment system adapted for a vehicle, comprising:
   a vehicle attachment system which includes attachment portions that engage cooperating parts on the vehicle allowing positioning of the step for attachment to the vehicle;
   a locking mechanism for manually or electronically locking of the step to the vehicle when it is positioned for attachment to the vehicle; and
   a bracket adapted to operably connect to the vehicle without use of tools, and the bracket and step are removable from the vehicle without use of tools, wherein the cooperating parts include two channels attached on the vehicle and the attachment portions include two extension members that nest into the channels by inward and downward movement of the bracket.

19. The system of claim 18 wherein one of said two channels is underneath the running board of the vehicle and the other one is outboard of the vehicle.

20. The system of claim 18 wherein each of the two channels include a downwardly extending leg an outwardly extending leg, and upwardly angled leg for forming the channel.

* * * * *